No. 776,496. PATENTED DEC. 6, 1904.
R. F. CORNEIL.
CHURN.
APPLICATION FILED APR. 22, 1904.
NO MODEL. 2 SHEETS—SHEET 1.
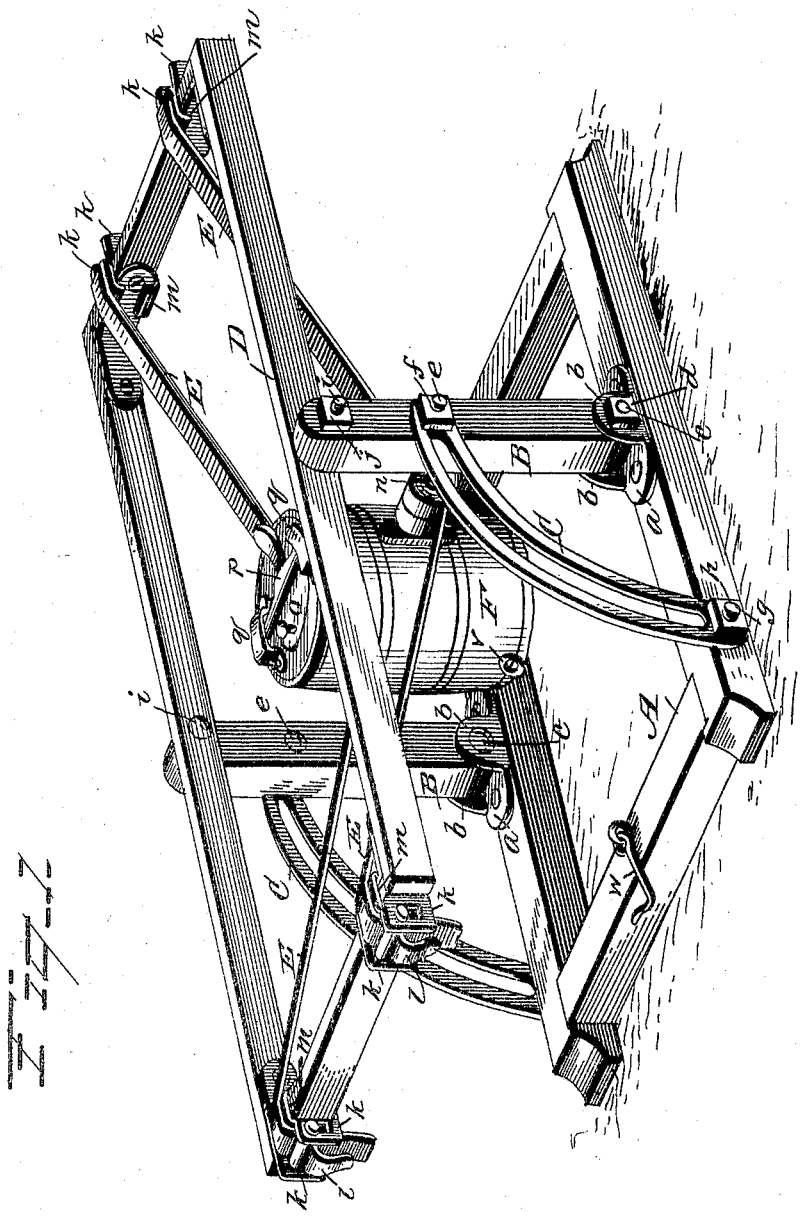
Witnesses
Inventor
Robert F. Corneil.
By Chas. H. Fowler
Attorney No. 776,496. PATENTED DEC. 6, 1904.
R. F. CORNEIL.
CHURN.
APPLICATION FILED APR. 22, 1904.
NO MODEL. 2 SHEETS—SHEET 2.
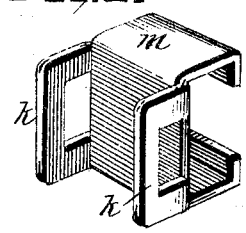
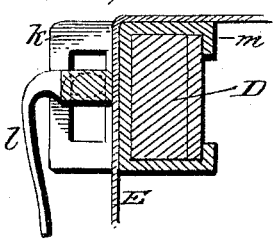
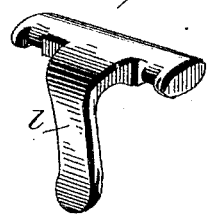
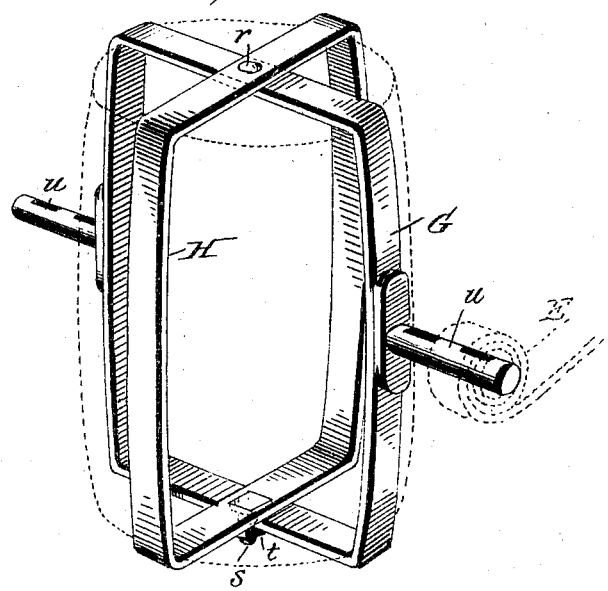
Witnesses
D. Williamson
M. E. Moore
Inventor
Robert F. Corneil.
By Chas. H. Fowler
Attorney No. 776,496. Patented December 6, 1904.

UNITED STATES PATENT OFFICE.

ROBERT F. CORNEIL, OF PHILLIPSBURG, MONTANA.

CHURN.

SPECIFICATION forming part of Letters Patent No. 776,496, dated December 6, 1904.

Application filed April 22, 1904. Serial No. 204,381. (No model.)

*To all whom it may concern:*

Be it known that I, ROBERT F. CORNEIL, a citizen of the United States, residing at Phillipsburg, in the county of Granite and State of Montana, have invented certain new and useful Improvements in Churns; and I do hereby declare that the following is a full, clear, and exact description of the same, reference being had to the annexed drawings, making a part of this specification, and to the letters of reference marked thereon.

The present invention has for its object to provide a churn in which the cylinder thereof is suspended by suitable belts or ropes to an oscillating frame supported upon a stationary frame, motion being imparted to the cylinder through the medium of the belts or ropes and the rocking movement of the frame to which the same are connected, thereby enabling the churn to be operated with comparatively little exertion, the cylinder gravitating and revolving upon its connections by the belts or ropes winding and unwinding with a forward-and-backward motion, thus facilitating the agitating of the milk or cream to induce the separation of the oily globules from the other portions thereof.

The invention consists in a churn constructed substantially as shown in the drawings and hereinafter described and claimed.

Figure 1 of the drawings is a perspective view of a churn embodying my invention; Fig. 2, a detail perspective view of the buckle-clamp with the lever removed, the buckle-clamp being shown on an enlarged scale; Fig. 3, a cross-section through one end of the oscillating frame, showing the buckle-clamp and belt connected thereto; Fig. 4, a perspective view of the lever of the buckle-clamp; Fig. 5, a perspective view of the harness for the churn-cylinder, showing the cylinder and one end of the belt wound around the trunnion in dotted lines; Fig. 6, a detail view showing the end of one of the slotted segmental braces connecting with the stationary frame of the churn.

In the accompanying drawings, A represents a stationary frame which forms a support for the upright standards B, which are pivoted thereto in any suitable manner, but preferably by the brackets $a$, secured to the frame, and the ends of the standards pivoted thereto between the ears $b$ by the bolts $c$ and nuts $d$, so that the standards may be folded down against the frame.

The standards B are held in an upright position by means of the slotted segmental braces C, secured thereto by bolts $e$ and nuts $f$ and to the frame A by bolts $g$ and nuts $h$, as shown in Fig. 1 of the drawings, the slots in the braces admitting the standards to be brought down against the frame by loosening the bolts and nuts which fasten the braces thereto.

Pivoted to the upper ends of the standards B, through the medium of the bolts $i$ and nuts $j$, is an oscillating frame D, and to the ends of this frame are adjustably and removably connected the outer ends of suitable straps E through the medium of buckle-clamps. These buckle-clamps are shown in detail in Figs. 2, 3, and 4 of the drawings and comprise the loops or slotted plates $k$, with which the ends of the clamping-lever $l$ engage, and the slide $m$, projecting from the loops or slotted plates, which embraces the end beams of the oscillating frame, the clamping-lever holding the belt or strap to the slide and clamping the slide to the beam. I do not wish, however, to be confined to any particular means for attaching the ends of the straps to the ends of the oscillating frame, as any suitable means may be employed so long as such means will admit of the straps being detached when desired and also their lengths adjusted to regulate the throw of the churn-cylinder. The opposite ends of the straps E are connected to suitable trunnions $n$, secured to a churn-cylinder F, which wind around the same and unwind with the forward-and-backward motion of the frame D to give the desired motion to the cylinder. This churn-cylinder may be of any suitable construction and may be provided with a cover $o$, secured by lever $p$, the ends of which engage cam-straps $q$, as shown in Fig. 1 of the drawings, or any other suitable means may be provided for holding closed the cover of the cylinder. A folding harness of metal may be provided for holding the churn-cylinder and comprises two rectangular frames, as shown at G and H in Fig. 5 of the drawings, the two frames over and under lapping each other and pivoted at their over and under lapping centers by means of the pivot-pins $r$ $s$. The pin $s$ has screw-threads for engaging therewith a nut $t$, so that when the rectangular frames G H are pulled out at right angles to each other, as shown in the drawings, and around the churn-cylinder, as shown in dotted lines, the harness will be perfectly rigid; but when the harness is not required for use the nut $t$ may be loosened and the rectangular frames folded together.

The rectangular frame G is provided with trunnions $u$ of any preferred construction, to which the ends of the straps E may be fastened.

An eye $v$ upon the churn-cylinder and the hook $w$ upon the frame A provide means for holding the cylinder stationary when desired, and when not required for use or for transportation both the stationary and oscillating frame and also the standards and braces may be folded together in a compact form.

It is evident that many changes and modifications of the invention may be resorted to without in any manner departing from the essential features of the invention.

The stationary frame, as well as the oscillating frame, may be changed in their form and construction, as may also the standards and the slotted braces therefor, and the churn-cylinder and the means employed for closing and holding down the cover thereon may be changed in their construction as circumstances would require, such departure from the construction shown and described coming with ordinary mechanical judgment.

Having now fully described my invention, what I claim as new, and desire to secure by Letters Patent, is—

1. A churn comprising a stationary frame, standards pivoted thereto, slotted segmental braces connected to the frame and standards and enabling said standards to be folded down against the frame, an oscillating frame pivoted to the upper ends of the standards and of sufficient length to extend over each end of the stationary frame to be used as handles at either end thereof, a suitable churn-cylinder, and straps connecting therewith and removably and adjustably connected to the ends of the oscillating frame, substantially as and for the purpose set forth.

2. A churn comprising a stationary frame, standards pivoted thereto and adapted to fold down thereon, segmental slotted braces connected to the stationary frame and to the standards, a suitable churn-cylinder, a folding harness for said cylinder consisting of two rectangular frames pivoted together and means for holding the frames extended, straps connected to the harness, buckle-clamps to which the straps are adjustably connected, said straps adapted for adjustment along the ends of the oscillating frame, substantially as and for the purpose described.

In testimony whereof I affix my signature in presence of two witnesses.

ROBERT F. CORNEIL.

Witnesses:
WILLIAM H. PASCOE,
WILLIAM W. GLEN.